(12) United States Patent
Boi et al.

(10) Patent No.: US 12,354,798 B2
(45) Date of Patent: Jul. 8, 2025

(54) SUPERCAPACITOR SEALING LID

(71) Applicant: FREUDENBERG SEALING TECHNOLOGIES S.A.S. DI EXTERNA ITALIA S.R.L.U., Pinerolo (IT)

(72) Inventors: Alessandro Boi, Pinerolo (IT); Francesco Giai, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 147 days.

(21) Appl. No.: 18/030,342

(22) PCT Filed: Oct. 12, 2021

(86) PCT No.: PCT/IB2021/059325
§ 371 (c)(1),
(2) Date: Apr. 5, 2023

(87) PCT Pub. No.: WO2022/079581
PCT Pub. Date: Apr. 21, 2022

(65) Prior Publication Data
US 2023/0377809 A1   Nov. 23, 2023

(30) Foreign Application Priority Data
Oct. 12, 2020   (IT) ................. 102020000023932

(51) Int. Cl.
| | | |
|---|---|---|
| *H01G 11/80* | (2013.01) | |
| *F16J 13/14* | (2006.01) | |
| *F16J 15/12* | (2006.01) | |

(52) U.S. Cl.
CPC .............. *H01G 11/80* (2013.01); *F16J 13/14* (2013.01); *F16J 15/125* (2013.01)

(58) Field of Classification Search
CPC ........ H01G 11/80; H01G 2/103; H01G 11/74; F16J 13/14; F16J 15/125; Y02E 60/13
See application file for complete search history.

(56) References Cited

U.S. PATENT DOCUMENTS

| | | | | |
|---|---|---|---|---|
| 4,433,361 A | * | 2/1984 | Wolf | H01G 4/236 |
| | | | | 429/174 |
| 5,201,625 A | * | 4/1993 | Takenouchi | H01R 13/6215 |
| | | | | 439/364 |

(Continued)

FOREIGN PATENT DOCUMENTS

| | | |
|---|---|---|
| CN | 201966072 U | 9/2011 |
| CN | 204489540 U | 7/2015 |

(Continued)

OTHER PUBLICATIONS

Office Action issued in counterpart European Application No. 21807243.7 on Sep. 21, 2023.

*Primary Examiner* — Dion R. Ferguson
(74) *Attorney, Agent, or Firm* — The Belles Group, P.C.

(57) ABSTRACT

A sealing lid for sealing a compartment of a supercapacitor housing electrodes and electrolytic material is described, the supercapacitor comprises: a casing internally defining the compartment and having a longitudinal axis, a side wall extending around the longitudinal axis, an axial bottom wall and an axial opening for accessing to the compartment arranged on an axially opposite side of the side wall with respect to the end wall; and at least one terminal electrically connected to one of the electrodes and protruding outside the compartment through the axial opening; the lid is adapted to close the axial opening and comprises an elastomeric element having: an internal through-hole adapted to receive the terminal and delimited by an internal wall adapted to coop- (Continued)

erate in fluid-tight contact with the terminal; and a peripheral wall adapted to cooperate in fluid-tight contact with the side wall.

8 Claims, 1 Drawing Sheet

(56) References Cited

U.S. PATENT DOCUMENTS

| | | | |
|---|---|---|---|
| 9,911,538 B2 * | 3/2018 | Jourdren | H01G 11/84 |
| 12,038,036 B2 * | 7/2024 | Foucart-Gaudy | F16J 15/028 |
| 2019/0304711 A1 * | 10/2019 | Hansen | H01G 11/74 |
| 2021/0391122 A1 | 12/2021 | Park | |
| 2023/0377809 A1 * | 11/2023 | Boi | H01G 11/74 |

FOREIGN PATENT DOCUMENTS

| | | | | |
|---|---|---|---|---|
| CN | 109910642 A1 | | 6/2019 | |
| CN | 209679229 U | | 11/2019 | |
| DE | 3003762 A1 | | 9/1981 | |
| DE | 102010041030 A1 | * | 3/2012 | F02F 11/00 |
| EP | 2017862 A1 | | 1/2009 | |
| EP | 2614512 A2 | | 7/2013 | |
| EP | 3923308 A1 | | 12/2021 | |
| JP | H0538459 | * | 4/1993 | |
| JP | 2000306557 A | * | 11/2000 | |
| WO | 2012032407 A2 | | 3/2012 | |

* cited by examiner

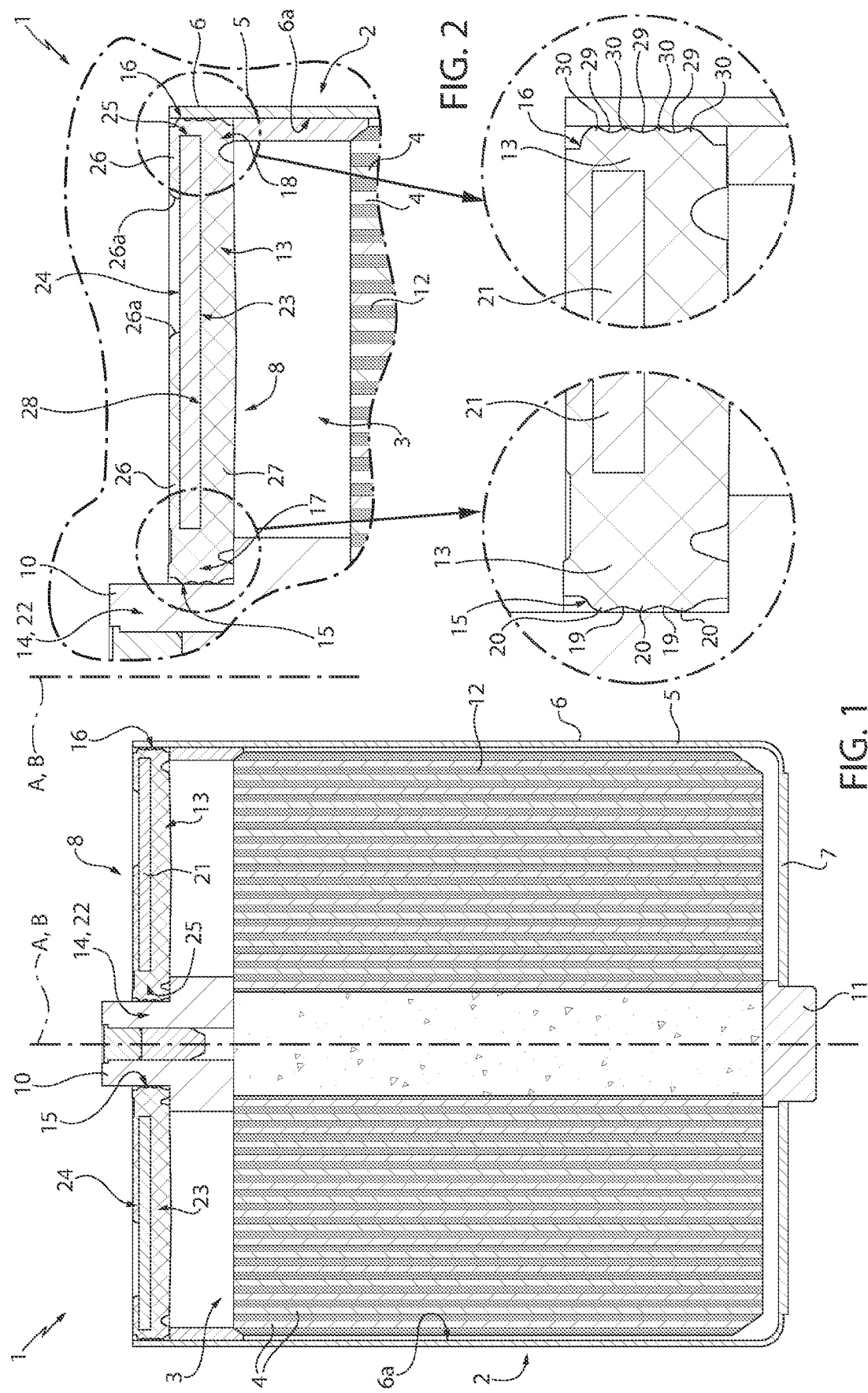

SUPERCAPACITOR SEALING LID

CROSS-REFERENCE TO RELATED APPLICATIONS

This Patent Application is a U.S. national stage application under 35 U.S.C. § 371 of PCT Application No. PCT/IB2021/059325, filed on Oct. 12, 2021, which claims priority from Italian Patent Application No. 102020000023932 filed on Oct. 12, 2020. The entire disclosure of the aforementioned priority applications are incorporated herein by reference in their entireties.

TECHNICAL SECTOR

The present invention relates to a supercapacitor sealing lid, in particular a lid for the fluid-tight sealing of a compartment for housing the electrodes and electrolytic material of a supercapacitor.

PRIOR ART

Supercapacitors are known, also known as ultracapacitors, which are used as electrical energy accumulators.

A supercapacitor is in fact a special type of capacitor which has the characteristic of storing a much greater amount of electrical charge than conventional capacitors.

Supercapacitors are also known for their high specific power: they can be charged (or discharged) in a relatively short time if compared to the time required to charge a normal chemical accumulator (battery). Another advantage of supercapacitors is that they have a much longer service life than conventional chemical accumulators.

In addition, supercapacitors are characterised by a low energy density if compared to chemical accumulators, which translates into a lower energy storage capacity than chemical accumulators themselves.

A supercapacitor of the known type typically comprises a hollow prismatic or cylindrical casing, usually made of metal, and two electrodes, one positive and one negative, housed within a compartment defined by the casing.

The compartment also houses a separator, or insulator, electrically interposed between the two electrodes.

Inside the housing compartment, the electrodes and separator are immersed in an electrolytic solution, usually liquid or gelatinous.

In a known configuration, the casing has a cylindrical shape around a longitudinal axis and comprises a side wall extending along the axis, an axial bottom wall and an axial opening for accessing the housing compartment opposite the bottom wall. While manufacturing the supercapacitor, the electrodes, normally defined by coaxial rolls wound to each other and together with the insulator, and the electrolytic material are inserted into the compartment through this axial opening.

Typically, the supercapacitor has a lid for closing the axial opening and thereby fluid-tightly sealing the supercapacitor compartment.

The supercapacitor normally comprises two terminals, each one electrically connected to a respective electrode and extending outside the casing to be connected to a power socket or apparatus using the supercapacitor charge.

The two terminals, conveniently made of conductive metal material, such as aluminium, are both arranged at the lid or, alternatively, one at the lid and the other at the bottom wall.

For example, in a known configuration, the terminals are arranged one at the lid and the other at the bottom wall, in a position coaxial to each other and to the axis of the casing, and axially protrude from the lid and from the bottom wall, respectively.

In this configuration, the lid has a terminal passage internal hole (two holes if both terminals are arranged at the lid).

The lid, typically made of metal, is normally welded to the terminal (or terminals) at the aforesaid hole, while being coupled, at its outer peripheral wall, to the side wall of the casing.

Typically, a gasket, configured to fluid-tightly seal the housing compartment, is interposed between the peripheral wall of the lid and the side wall of the casing.

Examples of the above-described supercapacitors are disclosed in EP2614512, EP2017862, CN109910642 and CN201966072U.

It is well known that during operation, electrolytic gases generate which permeate the housing compartment. It is also known to pressurise the housing compartment in order to ensure optimal operation of the supercapacitor.

Therefore, it is necessary to ensure the correct positioning of the gasket and its nominal operability, in order to avoid leakage of electrolytic material or electrolytic gas between the lid and the casing.

It is also known that the welded coupling between the lid hole and the terminal (or terminals) is susceptible to leakages over time.

It is thus felt the need to improve the known supercapacitor sealing lids, especially as concerns their service life and their ease of manufacture and coupling to the supercapacitors themselves.

OBJECT AND SUMMARY OF THE INVENTION

Aim of the present invention is to make a supercapacitor sealing lid which is highly reliable and cheap, and which allows to overcome at least some of the drawbacks specified above and related to the supercapacitor sealing lids of the known type.

According to the invention, this aim is achieved by a supercapacitor sealing lid as claimed in claim 1.

BRIEF DESCRIPTION OF THE DRAWINGS

For a better understanding of the present invention, a preferred non-limiting embodiment is described below, purely by way of example and with the aid of the attached drawings, wherein:

FIG. 1 is a cross-section, with parts removed for clarity, of a supercapacitor having a compartment sealed by a sealing lid according to the present invention; and FIG. 2 shows, on an enlarged scale, a detail of FIG. 1.

DETAILED DESCRIPTION

With reference to the attached figures, 1 denotes as a whole a sealing lid for a supercapacitor 2.

In particular, the lid 1 is configured to fluid-tightly seal a compartment 3 containing the electrodes 4 and the electrolytic material of the supercapacitor 2.

FIG. 1 shows schematically and in cross-section an example of a supercapacitor 2 to which the lid 1 according to the present invention is adapted to be coupled.

In detail, the supercapacitor 2 comprises:

a casing 5 internally defining the compartment 3 and having a longitudinal axis A, a side wall 6 extending around, and along, the longitudinal axis A, an axial bottom wall 7 and an axial opening 8 for accessing the compartment 3 arranged on the axially opposite side of the side wall 6 with respect to the bottom wall 7;

a first terminal 10 electrically connected, in a manner known and not described in detail, to one of the two electrodes 4 and projecting outside the compartment 3 through the opening 8; and a second terminal 11 electrically connected to the other of the two electrodes 4 and arranged at the bottom wall 7, in particular extending from, and through, the bottom wall 7.

The first terminal 10 and the second terminal 11 extend outside the compartment 3 to be connected, in use, to a power socket or apparatus using the energy stored in the supercapacitor 2.

Conveniently, the terminals 10, 11 are made of conductive metal material, such as aluminium.

Preferably, the casing 5 is made of metal material.

According to this preferred and non-limiting embodiment, the casing 5 has a substantially cylindrical shape of axis A, which is therefore an axis of symmetry for the casing 5, and the two terminals 10, 11 are arranged coaxially to the axis A.

The electrodes 4 are wound in a spiral, concentrically to each other and coaxially to the axis A, and are housed in the compartment 3 immersed in a known and unspecified electrolytic material, such as a liquid or gelatinous electrolytic solution.

According to a known technique, the compartment 3 further accommodates a separator 12 made of electrically insulating material and electrically interposed between the two electrodes 4, as shown in FIG. 1.

According to an alternative embodiment not shown, the casing has a prismatic shape with a section that is polygonal or polygonal with rounded edges. In addition, the terminals 10, 11 may be both arranged at the opening 8. In this last case, the terminals 10, 11 are arranged eccentric with respect to the axis A.

The lid 1 is designed to close the opening 8 to fluid-tightly seal the compartment 3, so as to limit, in particular prevent, electrolytic material from leaking.

It is well known that while the supercapacitor 2 is in operation, electrolytic gases generate which permeate the compartment 3.

In one embodiment, these electrolytic gases lead to an increase in the pressure inside the compartment 3 to a value of 15 bars.

Therefore, the lid 1 is also configured to define an operating pressure sealing inside the compartment 3.

As visible in FIG. 1 and, in particular, in FIG. 2, the lid 1 according to the preferred and non-limiting embodiment described and shown herein has an annular shape around a central axis B.

In particular, the lid 1 is configured to be coupled to the lid 5 so that the axis B is coaxial to the axis A.

The lid 1 comprises an elastomeric element 13 having an internal through hole 14, which is configured to receive the first terminal 10 and is delimited by an internal wall 15, and a peripheral wall 16.

Advantageously, the internal wall 15 of the internal hole 14 is adapted to cooperate in fluid-tight contact with the first terminal 10 and the peripheral wall 16 is adapted to cooperate in fluid-tight contact with the side wall 6, in particular when the lid 1 is coupled to the casing 5 to close the opening 8.

In the example described, the internal hole 14 is obtained in the elastomeric element 13 coaxially to the axis B, in order to coaxially receive the first terminal when the lid closes the opening 8.

Therefore, the elastomeric element 13 also has an annular shape around the axis B and comprises an internal radial end portion 17, bearing the internal wall 15, configured to cooperate in contact and fluid-tightly with the first terminal 10, and an outer radial end portion 18, bearing the peripheral wall 16, configured to cooperate in contact and fluid-tightly with the side wall 6 of the casing 5, so as to fluid-tightly seal the compartment 3 when the lid 1 is coupled to the casing 5 to close the opening 8.

Preferably, the peripheral wall 16 is adapted to cooperate in contact and fluid-tightly with an inner surface 6a of the side wall 6, the inner surface 6a facing towards the axis A.

In light of the above, the elastomeric element 13 extends, radially, in a single piece and without solution of continuity from the internal wall 15 to the peripheral wall 16, or, in use, from the first terminal to the inner surface 6a of the side wall 6.

Thus, the elastomeric element 13 entirely defines an axial lid and a sealing gasket for the compartment 3 of the supercapacitor 2, fulfilling the double function of closure and fluid-tightness in a single component.

Conveniently, the internal wall 15 has a plurality of grooves 19, preferably circumferential around the axis B, defining a set of successive ridges 20 and valleys 19 along the internal wall 15 itself. The ridges are designed to cooperate in fluid-tight contact with the first terminal 10.

In particular, the internal wall 15 has two circumferential grooves 19 around the axis B and defining two successive ridges 20 with the groove 19 interposed between the latter ones and defining a valley 19.

In practice, the internal wall 15 comprises a plurality of sealing lips.

The Applicant observed that such a configuration allows, in use, to limit as much as possible, and in particular to prevent electrolytic material and/or electrolytic gases contained within compartment 3 from leaking and, at the same time, to ensure a nominal pressure seal at a critical area as regards leakages.

As shown in the attached figures, the lid 1 further comprises an insert 21 made of a rigid material, preferably metal, such as steel, incorporated within the elastomeric element 13.

In detail, the insert 21 is defined by a disc-shaped or discoidal element having a hole 22 surrounding the internal hole 14 of the elastomeric element.

In greater detail, the hole 22 has a radial dimension (i.e. a diameter) larger than that of the internal hole 14.

In other words, the insert 21 is defined by a washer.

The insert 21 includes:

a first surface 23 configured to be facing, when the lid 1 closes, in use, the axial opening 8, towards the compartment 3;

a second surface 24, opposite the first surface 23, and configured to be facing, when the lid 1 closes the axial opening 8, towards the outside; and a lateral surface 25 interposed between the first 23 and the second 24 surface.

In the example described, surfaces 23, 24 are axial and annular relative to the B axis, while surface 25 is circumferential relative to the B axis.

The elastomeric element 13 partially covers the insert 21: in particular, the elastomeric element 13 covers at least the first surface 23 and the lateral surface 25, more particularly it partially covers also the second surface 24.

More precisely, the semi-profile of the elastomeric element 13 has, if compared to the axis B, a substantially C-shape with the end portions 26 folded towards one another and the free ends 26a supported by them facing one another.

In this way, the C central portion 27, i.e. of the semi-profile, and the end portions 26 thus folded partially delimit a cavity 28 for housing the insert 21.

In other words, the elastomeric element 13 comprises an annular cavity 28 housing the insert 21, coaxial to the axis B and open at the top so as to leave the second surface 24 of the insert 21 partially uncovered.

According to this preferred, non-limiting embodiment, the radially innermost end portion 26 has a greater length than the radially outermost end portion 26.

Conveniently, the peripheral wall 16 has a plurality of grooves 29, preferably circumferential around the axis B, defining a set of successive ridges and valleys 29 along the peripheral wall 16 itself. The ridges 30 are designed to cooperate in fluid-tight contact with the inner surface 6a of the casing 5.

In particular, the peripheral wall 16 has three circumferential grooves 29 around the axis B and defining four successive ridges 30.

In practice, the peripheral wall 16 comprises a plurality of sealing lips.

The Applicant observed that such a configuration allows, in use, to limit as much as possible, and in particular to prevent electrolytic material and/or electrolytic gases contained within compartment 3 from leaking and, at the same time, to ensure a nominal pressure seal at a critical area as regards leakages.

According to an alternative embodiment not shown, the elastomeric element 13 comprises, at the outer radial end portion 18, a radial projection (not shown) protruding from the peripheral wall 16 and designed to engage, when mounted to the supercapacitor 2, a corresponding groove (not shown) obtained in the side wall 6 of the casing 5. Thereby, the elastomeric element 13, and thus the lid 1, is fixed to the casing 5.

According to a further alternative embodiment not shown, the elastomeric element 13, and thus the lid 1, is simply fitted with interference against the surface 6a of the side wall 6 of the casing 5, the peripheral wall 16 being substantially smooth.

According to an embodiment not shown, an end portion of the casing 5 located at the lid 1 is configured to be partially folded over the lid 1 and, in particular, over the radially outermost end portion 26 of the elastomeric element 13. Thereby, the folded portion of the casing 5 ensures that the lid 1 is held in place during operation.

According to an embodiment not shown, the terminal comprises a groove (not shown) adapted to receive a corresponding protrusion (not shown) of the internal wall 15 of the elastomeric element 13. Such a configuration would further improve the positioning of lid 1.

After examining the characteristics of the lid 1 made according to the present invention, the advantages it allows to obtain are clear.

In particular, since the elastomeric element 13 extends, in use, in one piece and without solution of continuity from the terminal 10 to the side wall 6 of the casing, it is possible to obtain an efficient lid 1 sealing the compartment 3 of the supercapacitor 2 in a simple manner and with as few components as possible.

In fact, the elastomeric element 13 entirely defines an axial lid and a sealing gasket for the compartment 3 of supercapacitor 2, fulfilling the dual function of closure and fluid-tightness in a single component, with particular advantages in terms of simplifying the architecture and production of a supercapacitor lid.

In addition, the Applicant observed that the presence of the insert 21 provides increased stiffness to the lid 1, further improving fluid-tightness and pressure-tightness performance inside the compartment 3.

Furthermore, if compared to known sealing gaskets, which are very flexible and difficult to manipulate, which have to be manually enlarged and which often exit from the appropriate seat while assembling the supercapacitor 2, the lid 1 according to the invention simply has to be fitted at the opening 8 so that the hole 14 is engaged by the terminal 10, thus simplifying assembly operations.

Finally, as the lid 1 has couplings to the supercapacitor 2 only between elastomeric material and parts of the supercapacitor 2, rather than metal parts welded, in use, the fluid tightness of the lid 1 is improved.

It is clear that the lid 1 described and shown herein may be subject to modifications and variations without departing from the scope of protection defined by the claims.

In particular, the lid 1 may comprise an internal hole 14 eccentric with respect to the axis B, in the event that the first terminal 10 is arranged eccentric with respect to the axis A. In such a case, the elastomeric element 13 and the insert 21 will have an eccentric annular shape.

Otherwise, the lid 1 may comprise two internal holes eccentric with respect to the axis B, in the event that both the first terminal 10 and the second terminal 11 are arranged at the opening 8.

The invention claimed is:

1. Sealing lid for sealing a compartment of a supercapacitor housing electrodes and electrolytic material, said supercapacitor comprising:
   a casing internally defining said compartment and having a longitudinal axis, a side wall extending around the longitudinal axis, an axial bottom wall and an axial opening for accessing the compartment arranged on the axially opposite side of the side wall with respect to the bottom wall; and
   at least one terminal electrically connected to one of said electrodes and protruding outside of said compartment through said axial opening;
   said lid being configured to close said axial opening and comprising an elastomeric element having:
   an internal through hole configured to receive said terminal and delimited by an internal wall configured to cooperate in fluid-tight contact with said terminal; and
   a peripheral wall configured to cooperate in fluid-tight contact with said side wall;
   said lid comprising an insert made of rigid material, preferably metallic, incorporated at least partially in said elastomeric element;
   wherein said internal wall has at least one groove defining at least two successive ridges along the internal wall itself, the ridges being configured to cooperate in fluid-tight contact with the terminal.

2. Sealing lid as claimed in claim 1, wherein said peripheral wall is configured to cooperate in fluid-tight contact with an internal surface of said side wall facing towards the longitudinal axis.

3. Sealing lid as claimed in claim 1, wherein the elastomeric element extends in one piece without solution of continuity from said internal wall to said peripheral wall.

4. Sealing lid as claimed in claim 1, wherein the insert is defined by a discoidal element having a hole surrounding the internal hole of the elastomeric element and which discoidal element includes:
- a first surface configured to be facing, when the lid closes, in use, the axial opening, towards the compartment;
- a second surface, opposite the first surface, and configured to be facing, when the lid closes, in use, the axial opening, towards the outside; and
- a lateral surface interposed between the first and the second surfaces;
- the elastomeric element covering at least the first surface and the lateral surface.

5. Sealing lid as claimed in claim 4, wherein the elastomeric element covers, at least partially, the second surface.

6. Sealing lid as claimed in claim 1, wherein the elastomeric element has an annular shape around a central axis;
- wherein the semi-profile of the elastomeric element has a substantially C-shape with the end portions folded towards one another and the free ends facing one another; and
- wherein the central portion of the C semi-profile and the end portions thus folded partially delimit a cavity for housing the insert.

7. Sealing lid as claimed in claim 1, and having a central axis, said internal hole being arranged coaxially to the central axis;
- wherein the lid is configured to be arranged coaxially to the longitudinal axis of the casing and to receive said terminal, when said terminal is arranged coaxial to the longitudinal axis of the casing, coaxially at its own internal hole; and
- wherein the elastomeric element has an annular shape around the central axis and comprises an internal radial end portion, carrying said internal wall, configured to cooperate in fluid-tight contact with the terminal and an outer radial end portion, carrying said peripheral wall, configured to cooperate in fluid-tight contact with the side wall of the casing, so as to fluid-tightly seal the compartment.

8. A supercapacitor comprising:
- a casing, internally defining a compartment housing electrodes and electrolytic material, and having a longitudinal axis, a side wall extending around the longitudinal axis, an axial bottom wall and an axial opening for accessing the compartment arranged on the axially opposite side of the side wall with respect to the bottom wall;
- at least one terminal electrically connected to one of said electrodes and protruding outside of said compartment through said axial opening; and
- a sealing lid as claimed in claim 1 and configured to close the axial opening to seal said compartment in a fluid-tight manner;
- wherein the elastomeric element of the sealing lid extends in one piece without solution of continuity from the terminal to the side wall of the casing.

* * * * *